UNITED STATES PATENT OFFICE 2,516,153

ALPHA-BETA-SUBSTITUTED ALIPHATIC ACIDS AND THEIR SALTS AND ESTERS AND PROCESS FOR THEIR MANUFACTURE

Erwin Schwenk, Montclair, N. J., and Domenick Papa, Brooklyn, N. Y., assignors to Schering Corporation, Bloomfield, N. J., a corporation of New Jersey No Drawing. Application November 20, 1945, Serial No. 629,916

13 Claims. (Cl. 260—295)

The present invention relates to the manufacture of dicyclically substituted aliphatic carboxylic acids and their salts and esters, wherein one or both of the cyclic groups are non-benzenoid, one of such groups, preferably, being alicyclic, the cyclic radicals being attached to different carbon atoms of the aliphatic chain, the term "alicyclic" being employed generically to cover both saturated and unsaturated cyclo-aliphatic radicals, including those having internal ring structures, such as hexahydrobenzene, tetrahydrobenzene, tetralyl, terpene and terpene-like radicals, and cyclopentane and cyclopentene radicals.

More particularly, our invention relates to the manufacture of aryl-alicyclic, aryl-heterocyclic, alicyclic-heterocyclic, and other dicyclically substituted aliphatic carboxylic acids and their salts and esters, wherein the cyclic groups are attached to different carbons of the aliphatic acid chain, the aliphatic acid group being preferably, but not necessarily, acrylyl or propionyl, at least one of the cyclic groups being non-benzenoid, and being either alicyclic or heterocyclic, and either saturated or unsaturated.

The present application is a continuation in part of our copending application Serial No. 544,831, filed July 13, 1944, now abandoned.

We have found that alicyclically substituted aliphatic carboxylic acids, having an olefinic double bond in activating position with reference to a methylene group in α-position to the carboxyl, such as cycloalkene acetic acid and the cycloalkene-substituted homologous acids, and likewise the corresponding cycloalkylidene acetic and homologous acids, having in the α-position to the carboxylic group either a methylene radical or the group =CH—, can be condensed with a cyclic, such as an aromatic or heterocyclic aldehyde wherein the double bond of the aldehyde group forms part of a conjugated double bond system, as in the case, for example, of benzaldehyde, cinnamaldehyde, pyridinealdehyde, furfural, quinolinealdehyde, thiophenealdehyde, etc., to form dicyclic alkene carboxylic acids, substituted on the α-carbon by the cycloalkene radical and on another carbon by the aryl or heterocyclic group, such products being useful as intermediates for synthetic reactions such as the production of cyclopentanopolyhydrophenanthrene compounds or the manufacture of halogenated and particularly of iodinated and brominated compounds suitable for use as contrast agents in roentgenographic diagnosis, as chemotherapeutic agents, and for other purposes.

According to the present invention, alicyclic carboxylic acids of olefinic character, like Δ¹-cycloalkene acetic acid, the isomeric cycloalkylidene acetic acid, and the homologous acids, having a reactive methylene group (or a group convertible thereinto, such as

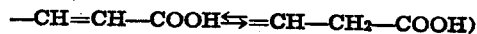

in the α-position to the carboxyl group, and either substituted or unsubstituted in the nucleus, are condensed in accordance with the Perkin reaction, or by various modifications of the Perkin reaction, and preferably although not necessarily in the form of the neutralized compounds, like the esters and the anhydrous alkali metal salt, such as the potassium salt, or in the form of the free acid and with the aid of a catalyst like a tertiary amine, such as triethyl or tributyl amine, with benzaldehyde, cinnamaldehyde or other aromatic aldehydes, or with a non-benzenoid cyclic aldehyde, wherein the double bond of the aldehyde group forms part of a conjugated double bond system as in cyclocitral, the nucleus of the aldehyde being substituted or unsubstituted, to form dicyclically substituted alkene carboxylic acids and their salts and esters. Also, substances which may be regarded as equivalents of cyclic aldehydes may be used, like the cyclic glyoxylic acids of the general formula RCO.COOH, wherein R is aryl (like phenyl) or heterocyclic (like thienyl), or other cyclic group. This reaction was quite surprising in view of the fact that the cycloalkane carboxylic acids do not take part in a Perkin type of reaction. Thus we have heated anhydrous sodium salt of cyclohexyl acetic acid with benzaldehyde in the presence of acetic anhydride and were able to isolate only cinnamic acid (produced by reaction of the benzaldehyde with acetic anhydride), but not even traces of the expected cyclohexyl cinnamic acid.

The products may, if desired, be hydrogenated in any suitable manner to produce the corresponding dicyclically substituted alkane carboxylic acids and their salts and esters.

The starting compounds, or only one of them, may contain substituting groups like hydroxyl, ether and ester groups, and halogen groups, preferably iodine. Thus 3,5-diiodo-4-hydroxy benzaldehyde, 2,4,6-triiodo-5-hydroxy benzaldehyde, 3,4-diiodo benzaldehyde, 4(or 2)-hydroxy-3,5-dibrombenzaldehyde, and the corresponding derivatives of cinnamaldehyde and higher aldehydes may be employed.

The reaction according to the invention is illustrated by the following equations:

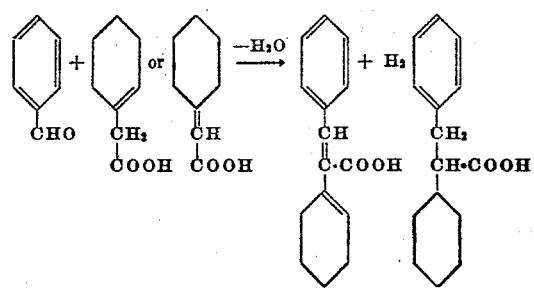

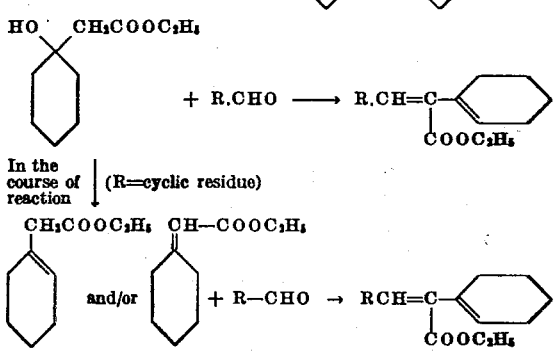

In the course of reaction (R=cyclic residue)

The ester group can be saponified to yield the free acid.

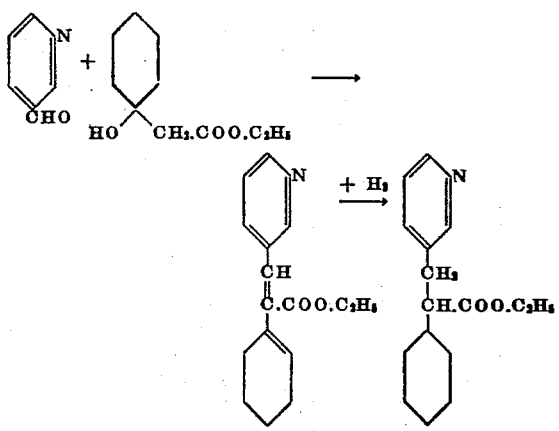

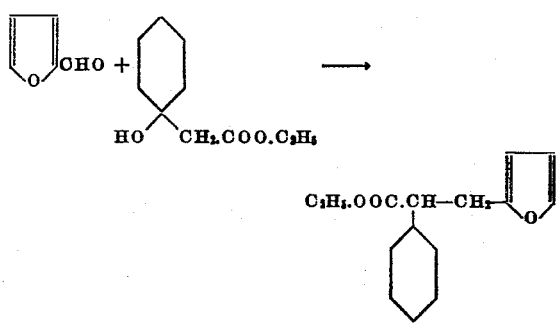

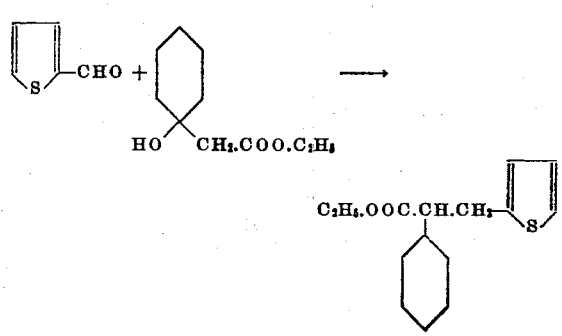

The production of intermediates suitable for the synthesis of cyclopentano polyhydro phenanthrene compounds is shown by the following:

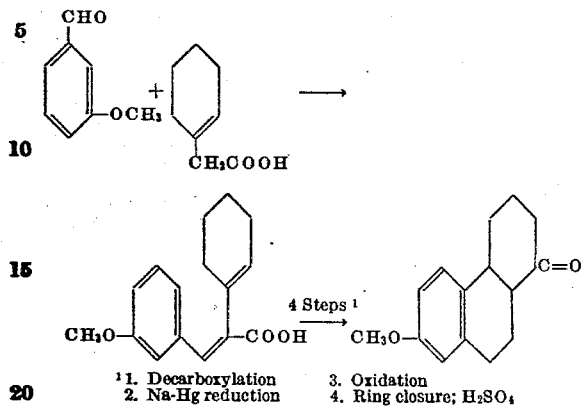

[1] 1. Decarboxylation  3. Oxidation
2. Na-Hg reduction  4. Ring closure; $H_2SO_4$ Halogenated compounds suitable for the manufacture of, or use as, contrast agents for roentgenography or as chemotherapeutic agents may, in accordance with the invention, be prepared in the following manner:

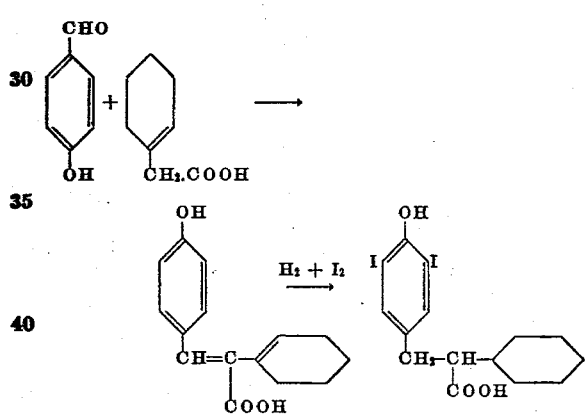

However, the halogen may be contained in one of the starting compounds as is shown by the following:

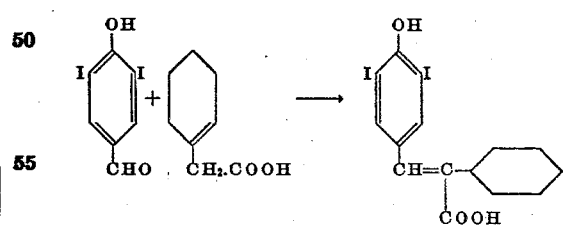

By the careful hydrogenation of α-cyclohexenyl 3,5-diiodo 4-hydroxy cinnamic acid, it is possible to obtain the corresponding saturated diiodo acid, as described above.

The iodinated compounds of the invention are indicated for use also as bactericidal agents and certain of them have shown effectiveness in the treatment of tropical diseases. Thus α-(cyclohexyl)-β-(3,5-diiodo-4-hydroxyphenyl)-propionic acid has proved valuable in controlling amebiasis in experimental animals.

Analogous condensation products can be prepared in accordance with the foregoing principles from terpene and terpene-like compounds. The following reactions with menthone are representative of the application of this condensation procedure to this class of compounds.

Menthone can be converted to a carboxylic acid as follows:

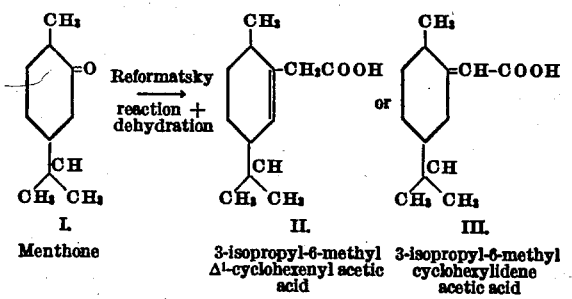

I. Menthone
II. 3-isopropyl-6-methyl Δ¹-cyclohexenyl acetic acid
III. 3-isopropyl-6-methyl cyclohexylidene acetic acid For the Reformatsky reaction on menthone see Wallach and Tholke, Ann. 323, 151 (1902).

Compounds II and III with aromatic aldehydes give compounds of the general formula

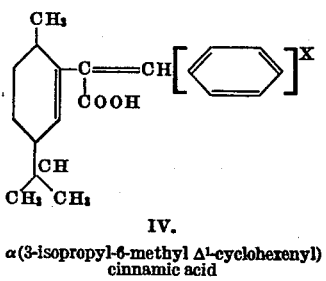

IV.
α(3-isopropyl-6-methyl Δ¹-cyclohexenyl) cinnamic acid wherein X represents one or more substituents in the aromatic nucleus, like hydroxyl, alkoxy, such as methoxy and ethoxy, iodo, etc.

In a similar fashion, camphor and 3,3,5-trimethyl cyclohexanone can be converted to the corresponding alicyclically substituted cinnamic acids and nuclearly substituted cinnamic acids.

Compound IV (X=hydrogen) on reduction gives α-(3-isopropyl 6-methyl cyclohexyl) β-phenyl propionic acid of the following formula:

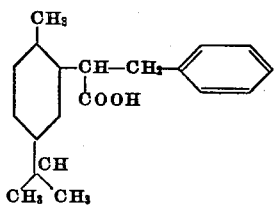

The corresponding derivatives of the higher unsaturated and (after hydrogenation) saturated aliphatic acids, and of alkadiene carboxylic acids, may be prepared by the use of the appropriate starting compounds, as will be evident to those skilled in the art from the above disclosure. Where products non-iodinated in the phenyl radical but containing a hydroxyl group or a functional derivative thereof, are obtained, the same may be halogenated in known manner, preferably after saturation of the alkene chain, to produce mono- or dihalo derivatives suitable for use as contrast and therapeutic agents.

The following examples illustrate specific procedures in accordance with the invention.

EXAMPLE I

α-(Δ¹-Cyclohexenyl) cinnamic acid

A mixture of 17.9 g. of anhydrous potassium-Δ¹-cyclohexenyl acetate and 10.6 g. of benzaldehyde was heated for eight hours at 105° C. with 100 cc. of acetic anhydride. The reaction mixture was then cooled to 60° and the excess acetic anhydride cautiously decomposed with water. The reaction mixture was poured on ice and the semi-solid residue extracted with ether. The acidic fraction was isolated from the ether by extraction with sodium carbonate solution. On acidification of the sodium carbonate extracts the α-(Δ¹-cyclohexenyl) cinnamic acid was obtained in the form of a pale yellow solid melting at 150–152° C. On recrystallization from a mixture of acetone and water the acid was obtained in the form of long, white, fine needles, melting at 156–157° C.

By the use of the isomeric anhydrous potassium cyclohexylidene acetate, this condensation yields the same product. It is advisable when using this acid to heat the reaction mixture for a few additional hours in order to secure a comparable yield.

The α(Δ¹-cyclohexenyl) cinnamic acid was reduced as follows: 10 g. of the acid were dissolved in 200 cc. of 10% sodium hydroxide. The mixture was heated to 90° C. and, with stirring, 15 g. of Raney nickel aluminum alloy added in the course of about one hour. The mixture was stirred for an additional hour at the same temperature, then filtered by decantation from the nickel, and the nickel washed twice with hot water. On acidification of the filtrate and washings to Congo red paper with concentrated HCl the crude β-phenyl-α-cyclohexyl propionic acid was obtained in a yield of 10 g., melting at 62–65° C. On recrystallization from a mixture of benzene and petroleum ether the reduced acid was obtained as long, fine, white needles melting at 70–71° C.

EXAMPLE II

α-(Δ¹-Cyclohexenyl) p-hydroxy cinnamic acid

Using either anhydrous potassium-Δ¹-cyclohexenyl acetate or anhydrous potassium cyclohexylidene acetate with p-hydroxy benzaldehyde under the conditions as described in Example I, the α-(Δ¹-cyclohexenyl) p-hydroxy cinnamic acid is obtained after recrystallization from acetone and water as long, white needles melting at 194–195° C.

When α-(Δ¹-cyclohexenyl) p-hydroxy cinnamic acid was reduced as described in Example I, a quantitative yield of β-(p-hydroxy phenyl)-α-cyclohexyl propionic acid was obtained. Recrystallized from a mixture of acetone and water the substituted propionic acid was obtained as fine, white needles melting at 180–181° C.

EXAMPLE III

α-(Δ¹-Cyclopentenyl) p-hydroxy cinnamic acid

Following the general procedure described for Example I, this acid is obtained by condensing either potassium cyclopentenyl or potassium cyclopentylidene acetate with p-hydroxy benzaldehyde. The product is obtained in the form of white needles which melt at 183° C. with decomposition.

The α-(Δ¹-cyclopentenyl) p-hydroxy cinnamic acid when reduced as described in Example I yields the α-cyclopentane-β-(p-hydroxy phenyl) propionic acid which melts at 175–178° C. Recrystallized from acetone and water the product was obtained as white needles melting at 180–181° C.

EXAMPLE IV

α-(α-6-methoxy-3,4 dihydro naphthalene) p-hydroxy cinnamic acid

Using the general procedure described in Example I, 12.8 g. of anhydrous potassium-6-methoxy-1-tetralidene acetate, 6.1 g. of p-hydroxy benzaldehyde and 100 cc. of acetic anhydride were heated for 10 to 12 hours at 105–110° C. The condensation product was isolated by the ether sodium carbonate extraction method, and after several recrystallizations from benzene and petroleum ether it melted at 189–191° C. with decomposition.

Five grams of the above substituted cinnamic acid, when reduced with Raney's alloy and aqueous alkali, yielded the α-(6-methoxytetralyl-1)-β-(p-hydroxy-phenyl) propionic acid, which melted at 168–174°. Recrystallization from aqueous alcohol gave the acid in the form of fine, white needles melting at 182–183°.

EXAMPLE V

The synthesis as outlined in Examples I to IV can be modified to avoid the use of the anhydrous alkali salts. This modification uses the free acid, cyclohexenyl, cyclopentenyl, and other alicyclic acetic acids with the appropriate aromatic aldehyde together with suitable catalysts, i. e., triethyl amine, anhydrous sodium or potassium acetate, anhydrous potassium carbonate, etc.

28 g. (0.2 m.) of cyclohexenyl acetic acid, 21.2 g. (0.2 m.) of benzaldehyde, 20.2 g. (0.2 m.) of triethyl amine and 61.2 g. (0.6 m.) of acetic anhydride were heated for 10–12 hours at 100–120° C. The reaction mixture was worked up as described for Example I yielding α($\Delta^1$-cyclohexenyl) cinnamic acid, M. P. 156–157° C.

Substitution of the cyclohexenyl acetic acid by cyclohexylidene acetic acid gave a comparable yield, but required a few additional hours of heating. Substitution of the triethyl amine by anhydrous potassium acetate likewise gave a good yield in the condensation.

In place of cyclohexenyl acetic acid or of cyclohexylidene acetic acid, and the similarly substituted homologous acids, there may be employed acetic acid and its homologues substituted by cyclohexanol, wherein both the hydroxyl and the acid group are joined to the same nuclear carbon. During the course of the reaction of such a cyclohexanol acetic acid or its ester with an aromatic or heterocyclic aldehyde in the presence of acetic anhydride (or other saturated aliphatic acid anhydride), and of a catalyst like trimethylamine, dehydration of the cyclohexanol acetic acid or ester takes place with the formation of either or both of $\Delta^1$-cyclohexenyl acetic acid and cyclohexylidene acetic acid, or homologous acids or esters.

EXAMPLE VI

α-($\Delta^1$-Cyclohexenyl) p-hydroxycinnamic acid

Ninety-three grams (0.5 m.) of ethylcyclohexanol-1 acetate, 61 gm. (0.5 m.) of p-hydroxybenzaldehyde, 150 gm. (1.5 m.) of triethylamine and 300 cc. of acetic anhydride were heated, preferably with stirring, for 25–35 hours at 100–110° C. At the end of the heating period the reaction mixture was cooled to 60° and the excess acetic anhydride cautiously decomposed by the addition of water. The resulting solution was poured into ice and the product extracted with ether. The ether solution was washed free of acetic acid, the ether evaporated, and the resulting residue, which was principally the ester of the condensation product, was saponified with either aqueous or alcoholic alkali. The saponified solution was then treated with carbon dioxide in order to convert the alkali to bicarbonate. After this treatment the solution was heated, treated with charcoal, and filtered. Upon acidification the α-($\Delta^1$-cyclohexenyl) p-hydroxycinnamic acid was precipitated and filtered. The product obtained melted at 191–193° C. after recrystallization from a mixture of acetone and water.

In place of the triethylamine, other organic amines may be used for catalyzing the condensation, as well as metallic salts such as sodium and potassium acetate.

α-(Cyclohexyl)-β-(p-hydroxyphenyl) propionic acid was obtained from α-($\Delta^1$-cyclohexenyl)-p-hydroxycinnamic acid by reducing 10 grams of the latter with Raney's alloy and aqueous alkali, as described in the Journal of Organic Chemistry, 9, 175 (1944). The substituted propionic acid was isolated in the usual manner and after recrystallization from aqueous acetone melted at 180–181° C.

EXAMPLE VII

α-($\Delta^1$-Cyclohexenyl) β-(α-furyl) acrylic acid 9.6 grams (0.1 m.) of freshly distilled furfural, 18.6 gm. (0.1 m.) of ethylcyclohexanol-1 acetate, 30.2 gm. of triethylamine and 75 cc. of acetic anhydride were heated in an atmosphere of nitrogen for 20–30 hours at 100–110° C. The reaction product was then worked up as described in Example VI and the α-($\Delta^1$-cyclohexenyl) β-(α-furyl) acrylic acid was obtained in the form of a light tan substance melting at 150–151.8° C. After recrystallization from a mixture of acetone and water the substituted acrylic acid melted at 151.3–151.8° C.

In a similar fashion thiophene aldehyde may be condensed with ethylcyclohexanol-1 acetate to give the α-($\Delta^1$-cyclohexenyl) β-(α-thienyl) acrylic acid. It has been found possible to use in place of thiophene aldehyde thiophene glyoxylic acid which is easily accessible from thiophene and ethyl oxalyl chloride via the Friedel-Crafts reaction.

The α-($\Delta^1$-cyclohexenyl)-β-(α-furyl) acrylic acid on reduction can be converted to the following products:

(a) α-(Cyclohexyl)-β-(tetrahydrofuryl) propionic acid was isolated from the ether extracts of the reduction product (this reduction was run with Raney's alloy and aqueous alkali, as described in Example VI) by extraction with sodium bicarbonate. The substance boiled at 174° C./2 mm. and showed $n^{25}=1.4950$. The ethyl ester of this acid boiled at 125° C./2 mm. and showed $n^{25}=1.4792$.

(b) From the above ether solution there was obtained the α-(cyclohexyl)-γ-n-propylbutyrolactone which boiled at 130° C./3 mm. and showed $n^{25}=1.4795$.

EXAMPLE VIII

α-($\Delta^1$-Cyclohexenyl) β-(3-pyridyl) acrylic acid 10.7 grams (0.1 m.) of freshly distilled pyridine-3 aldehyde, 18.6 gm. of ethylcyclohexanol-1 acetate (0.1 m.), 30.2 gm. of triethylamine, and 75 cc. of acetic anhydride were heated in a nitrogen atmosphere for 20–30 hours at 100–110° C. The reaction mixture, after decomposing the excess acetic anhydride with water, was poured on ice and extracted with ether, the ether evaporated, and the residue saponified with either alcoholic or aqueous alkali. The alkaline solution was then treated with carbon dioxide and the resulting bicarbonate solution, after filtration, was acidified with acetic acid. The precipitate was filtered and the α-($\Delta^1$-cyclohexenyl) β-(3-pyridyl) acrylic acid was obtained in the form of a pale yellow powder melting at 147–152° C. After two recrystallizations from a mixture of methanol and water the substituted pyridine acrylic acid was obtained in the form of pale yellow needles melting at 159.5–160° C.

In a similar fashion, 2-quinoline aldehyde undergoes condensation with ethylcyclohexanol-1 acetate to give α-(Δ¹-cyclohexenyl) β-(quinolyl-3-)-acrylic acid.

The product of Example VIII was converted into α-(Δ¹-cyclohexenyl)-β-(3-pyridyl) propionic acid by Raney nickel catalyst reduction in alcohol solution at 500 pounds pressure and a temperature of 100° C. The reduction product, after removal of the catalyst, was diluted with water, the alcohol evaporated, and the residue recrystallized from a mixture of alcohol and water. The melting point of the pure acid was 129–130° C.

Although in the foregoing the ethyl esters were generally preferred because of their ease of formation and relative non-toxicity of ethyl alcohol, it will be evident that other esters may be employed, like the benzyl, and especially the other lower aliphatic esters like the methyl, propyl and butyl.

EXAMPLE IX

*Preparation of α-(3,3,5-trimethylcyclohexyl)-β-(p-hydroxyphenyl) propionic acid*

By the usual Reformatsky reaction between trimethylcyclohexanone, ethylbromacetate, zinc, and a mixture of benzene and toluene as solvent, there is obtained the ethyl 3,3,5-trimethylcyclohexanol-1 acetate which boils at 103–104° C./2 mm. Many variations may be made in this procedure; for example, choice of solvents, type of zinc, etc. We have found that by using granular zinc in a 50–50 mixture of benzene and toluene, good yields of the ethyl trimethylcyclohexanol acetate are obtained.

Saponification of the above ethyl acetate compound with alcoholic sodium hydroxide yields the 3,3,5-trimethylcyclohexanol-1 acetic acid, which, after recrystallization from petroleum ether, melts at 116–117° C.

When the ethyl acetate derivative described above is dehydrated by any of the usual agents, for example, anhydrous HCl, fused potassium bisulfate, etc., there is obtained the unsaturated compound, ethyl 3,3,5-trimethylcyclohexylidene acetate or the ethyl 3,3,5-trimethyl-Δ¹-cyclohexenyl acetate. The type of dehydrating agent used will determine which one of these two isomers is secured. The unsaturated compounds boiled at 76° C./1 mm. When these compounds are saponified with alcoholic sodium hydroxide, there is obtained the 3,3,5-trimethylcyclohexylidene acetic acid or the isomeric Δ¹-3,3,5-trimethylcyclohexenyl acetic acid. One of these products which we have iso'ated, and which probably is the hexylidene compound, melts at 80–81° C. after recrystallization from petroleum ether.

By condensing 20 gm. of the trimethylcyclohexanol-1 acetic acid with 12 gm. of p-hydroxybenzaldehyde in the presence of 150 cc. of acetic anhydride with 40 cc. of triethylamine as catalyst, there is obtained, after working up the reaction mixture in the normal manner, α-(Δ¹-3,3,5-trimethylcyclohexenyl)-6-hydroxycinnamic acid. Satisfactory yields in this reaction were obtained when the reaction mixture described above was heated for a period of 25–35 hours at 100–110° C. The substituted cinnamic acid, after recrystallization from a mixture of methyl alcohol and water, melted at 181–182° C.

The substituted cinnamic acid, when reduced with Raney's alloy and aqueous alkali as mentioned in a previous example, yielded the α-(3,3,5-trimethylcyclohexyl)-β-(p-hydroxyphenyl) propionic acid. This substituted propionic acid, after recrystallization from aqueous alcohol, melted at 189–189.5° C.

EXAMPLE X

*Preparation of ethyl (3-methyl-6-isopropylcyclohexanol-1) acetate*

Seventy-five grams of menthone, 80 cc. of ethylbromacetate, 40 cc. of benzene-toluene (1:1), and 33 gm. of granular zinc were reacted in the usual Reformatsky manner. After the reaction was completed, the mixture was worked up in the usual manner, and on distillation there was isolated, after a small forerun of menthone, the methyl isopropylcyclohexanol ethyl acetate as a pale yellow oil boiling at 107°/1 mm.

By a series of transformations similar to that described under Example IX, this cyclohexanol ethyl acetate compound can be converted into the corresponding acids and dicyclic condensation products.

EXAMPLE XI

*Preparation of α-(cyclopentane)-β-(3,5-dibrom-4-hydroxyphenyl) propionic acid*

The reduction product of Example III was brominated with the calculated amount of bromine in acetic acid solution. On diluting with water, the brominated product separated out and melted at 135–137° C. After recrystallization from a mixture of chloroform and petroleum ether, the pure dibrom compound melted at 135–136° C.

The above acids can be converted by the usual reactions into the corresponding salts; for example, the alkali metal salts, such as sodium and potassium, the alkaline earth metal salts, such as those of calcium and magnesium, etc.; and the amine salts, like those of mono-, di-, and triethyl amines, dimethylamino ethanol, etc.

We claim:

1. Process for the manufacture of compounds of the group consisting of acrylic acids and their salts and esters having a cyclic group attached to each of the α- and β-carbons, comprising heating a member of the group consisting of ali-cyclically substituted acetic acids having a double bond connected to the cyclic carbon which is linked to the alpha-carbon, and their metal salts and esters, with a heterocyclic aldehyde wherein the double bond of the aldehyde group forms part of a conjugated double bond system, to effect condensation therebetween.

2. Process for the manufacture of acrylic acids, having a cyclic group attached to each of the α- and β-carbons comprising heating the ester of an ali-cyclically substituted acetic acid having a double bond attached to the nuclear carbon which is linked to the α-carbon, with a heterocyclic aldehyde wherein the double bond of the aldehyde group forms part of a conjugated double bond system to effect condensation therebetween, and saponifying the ester so formed.

3. Process according to claim 1, wherein the alicyclically substituted aliphatic acid compound is a cyclohexanol acetic acid ester.

4. Process according to claim 1, wherein the alicyclically substituted aliphatic acid compound is a cycloalkanol acetic acid ester.

5. Process according to claim 1, wherein the heterocyclic radical is pyridyl.

6. A member of the group consisting of acrylic and propionic acids of the formula $$R-X-R^1$$
$$|$$
$$COOH$$

and their non-toxic salts and esters, wherein R is selected from the group consisting of cycloaliphatic groups having 5 to 6 carbon atoms in the ring and their lower alkyl and lower alkoxy substitution products, $R^1$ is a heteromonocyclic radical of the group consisting of furyl, tetrahydrofuryl, pyridyl and thienyl radicals, and X is a two-carbon atom aliphatic chain, the carboxyl and R group being attached to one of the carbons of X while $R^1$ is attached to the other carbon of X.

7. Compounds as defined in claim 6 wherein R contains 6 carbon atoms.

8. Compounds as defined in claim 6 wherein $R^1$ is pyridyl.

9. Compounds as defined in claim 6 wherein $R^1$ is thienyl.

10. Compounds as defined in claim 6 wherein $R^1$ is furyl.

11. Process according to claim 1, wherein the heterocyclic radical is furyl.

12. Process according to claim 1, wherein the heterocyclic radical is thienyl.

13. α-(Δ¹-Cyclohexenyl)-β-pyridine-3-acrylic acid.

ERWIN SCHWENK.
DOMENICK PAPA.

REFERENCES CITED

The following references are of record in the file of this patent:

UNITED STATES PATENTS

| Number | Name | Date |
|---|---|---|
| 2,345,384 | Dohrn et al. | Mar. 28, 1944 |
| 2,400,433 | Natelson et al. | May 14, 1946 |

OTHER REFERENCES

Haller et al., Ann. de Chem. et de Physique (9), vol. 9, 247 (1918).

Adams et al., "Organic Reactions," vol. 1 (Wiley 1942), pp. 223–228, 240–241.

McRae et al., Chemical Abstracts 37, 4057 (1943).

Chem. Abstracts, vol. 37 (1943) 6225.

Cohen, "Organic Chemistry" (4th ed.), part 1, pp. 279–280.